United States Patent
Jho et al.

(10) Patent No.: US 8,745,696 B2
(45) Date of Patent: Jun. 3, 2014

(54) APPARATUS AND METHOD FOR PRIVACY PROTECTION IN ASSOCIATION RULE MINING

(75) Inventors: Nam-Su Jho, Seoul (KR); Abedelaziz Mohaisen, Daejeon (KR); Do-Won Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 460 days.

(21) Appl. No.: 12/968,420

(22) Filed: Dec. 15, 2010

(65) Prior Publication Data

US 2011/0145929 A1 Jun. 16, 2011

(30) Foreign Application Priority Data

Dec. 16, 2009 (KR) .................. 10-2009-0125220

(51) Int. Cl.
*H04L 29/06* (2006.01)

(52) U.S. Cl.
USPC ........................ 726/3; 726/32; 726/2

(58) Field of Classification Search
None
See application file for complete search history.

(56) References Cited

U.S. PATENT DOCUMENTS

| | | |
|---|---|---|
| 6,931,403 B1 | 8/2005 | Agrawal et al. |
| 2005/0021488 A1* | 1/2005 | Agrawal et al. .................. 707/1 |
| 2006/0015474 A1 | 1/2006 | Aggarwal et al. |
| 2010/0162402 A1* | 6/2010 | Rachlin et al. .................. 726/26 |

OTHER PUBLICATIONS

Jun-Lin Lin et al., "Privacy Preserving Itemset Mining Through Fake Transactions", ACM 1-59593-480-4, 2007.
Shariq J. Rizvi et al., "Maintaining Data Privacy in Association Rule Mining", Proceedings of the 28th VLDB Conference, 2002.
Ju-Sung Kang et al., "On the Privacy Mining Association Rules by using Randomization", Journal of KIPS, 2007, pp. 439-452.

* cited by examiner

*Primary Examiner* — Pramila Parthasarathy
(74) *Attorney, Agent, or Firm* — Staas & Halsey LLP

(57) ABSTRACT

There are provided an apparatus and a method for privacy protection in association rule mining among data mining technologies. An apparatus for privacy protection in association rule mining according to an embodiment of the present invention comprises: a fake transaction inserter that generates fake transactions of a predetermined number each having a predetermined length and inserts the fake transactions between a plurality of transactions comprised in an original data set to generate a first virtual data set; and a distortion transaction generator that generates a second virtual data set by converting data of the transaction of the first virtual data set with a predetermined probability.

12 Claims, 4 Drawing Sheets

APPARATUS AND METHOD FOR PRIVACY PROTECTION IN ASSOCIATION RULE MINING

CROSS REFERENCE TO RELATED APPLICATION

This application claims the benefit of Korean Patent Application No. 10-2009-0125220, filed on Dec. 16, 2009 which is hereby incorporated by reference in its entirety into this application.

BACKGROUND OF THE INVENTION

1. Field of the Invention

The present invention relates to a technology for protecting privacy in association rule mining (ARM) among data mining technologies. More specifically, the present invention relates to a technology to generate a new data set by inserting fake transactions into a data set comprises a plurality of transactions which are units of data and modify the transactions included in the new data set with a predetermined probability.

2. Description of the Related Art

A data mining technology is the technology analyzing the interrelationship between data and in particular, a research for a data mining technology for items provided as a database is actively being performed in a field such as an electronic commerce. Among the data mining technologies, the association rule mining is the technology that uses an object to effectively find relations between two (or more) attributes in a data set.

However, a violation of personal privacy information using data mining technology indiscriminately is increased. Therefore, a research of a privacy preserving data mining technology is performing actively. Privacy preserving association rule mining is a field of the research and is a technology of detecting the association rule of a total data set with preventing a leakage of privacy information of each transaction comprised in the data set. In the field of the privacy preserving association rule mining technology, quantization of privacy protection performance and optimization of a memory and quantity of calculation are also recognized as an important subject of the research.

SUMMARY OF THE INVENTION

An object of the present invention is to minimize the use of an additional memory and quantity of calculation for privacy protection while increasing the amount of protected privacy in protecting privacy in the above-mentioned association rule mining.

In order to achieve the above-mentioned object, an apparatus for privacy protection in association rule mining according to an embodiment of the present invention comprises: a fake transaction inserter that generates fake transactions of a predetermined number each having a predetermined length and inserts the fake transactions between a plurality of transactions comprised in an original data set to generate a first virtual data set; and a distortion transaction generator that generates a second virtual data set by converting data of the transaction of the first virtual data set with a predetermined probability.

Further, a method for privacy protection in association rule mining according to an embodiment of the present invention comprises: receiving an original data set and calculating an average length of a plurality of transactions comprised in the original data set by a fake transaction inserter; generating fake transactions of a predetermined number each having a predetermined length and insert the fake transactions between the plurality of transactions to generate a first virtual data set by the fake transaction inserter; and generating a second virtual data set by converting data of the transaction of the first virtual data set with a predetermined probability by a distortion transaction generator.

According to an embodiment of the present invention, an apparatus and a method for privacy protection in association rule mining can convert an original data set into a virtual data set through two algorithms. By this configuration, it is possible to reduce a memory use rate for the same privacy protection rate in comparison with a case using each algorithm separately. That is, it is possible to efficiently solve a problem in the use of an additional memory caused by privacy protection while increasing a privacy protection rate.

DETAILED DESCRIPTION OF THE PREFERRED EMBODIMENTS

Hereinafter, an apparatus for privacy protection in association rule mining according to an embodiment of the present invention will be described with reference to FIG. 1.

Figure 1:
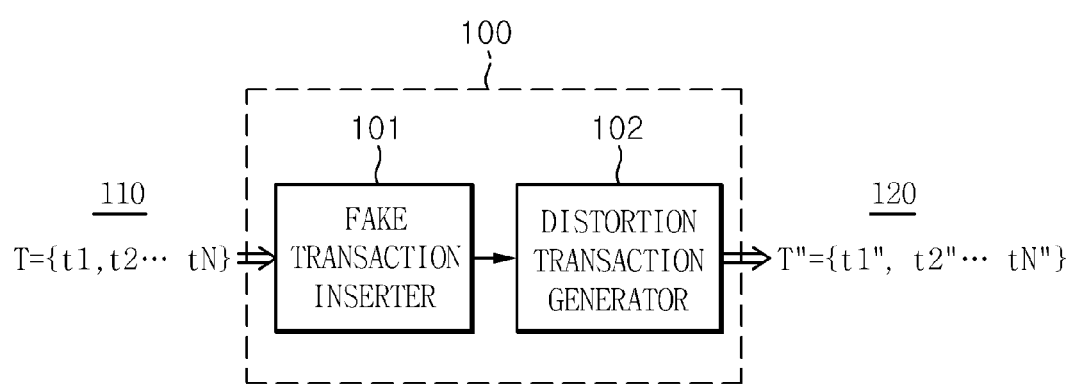
FIG. 1 is a diagram showing an apparatus for privacy protection in association rule mining according to an embodiment of the present invention.

FIG. 1 is a block diagram of an apparatus for privacy protection in association rule mining according to an embodiment of the present invention.

Referring to FIG. 1, the apparatus 100 for privacy protection in association rule mining includes a fake transaction inserter 101 and a distortion transaction generator 102. An original data set 110 T is inputted into the apparatus 100 for privacy protection in the association rule mining and finally outputted by being converted into a second virtual data set 120 T".

The fake transaction inserter 101 calculates an average length of transactions comprised in an original data set with receiving the original data set as an input. The fake transaction inserter 101 generates the fake transactions with making an average length of the fake transactions same with the average length of the transactions of the original data set. And each of the generated fake transactions will be inserted into a plurality of the transactions comprised in the original data set T.

When the original data set T is assumed as T={t1, t2~tN}, the fake transactions are inserted between ti (however, i represents an integer from 1 to N−1) and t(i+1).

The number of the fake transactions which will be inserted into the plurality of the transactions comprised in the original data set T is determined by a predetermined security parameter. The predetermined security parameter may be a variable which stands for a degree of the privacy protection determined by users' input. The number and the length of the fake transactions is set by and determined randomly by a probability distribution.

For example, the average of variables of the length of the transactions of the original data set is assumed as L (here, we assume that L is an integer for simplicity). In this case, the average of the length of the generated fake transactions must be the L. Therefore, the length may be selected to be an integer which is distributed with the same probability (that is, variables of a uniform distribution) in the range of 1 to 2 L−1.

In this case, every time when the fake transaction is generated, fake transaction generating algorithm uses one integer randomly selected between integers of 1 to 2 L−1 as the length of the fake transaction. In addition, other distribution such as normal distribution other than the uniform distribution may be used to generate the fake transactions. The probability distribution most similar with a probability distribution of the length of the transactions of the original data set may be favorable.

The number of the fake transactions inserted into the original data set is determined by the same way with the length of the fake transactions. In this case, an average of the number of the fake transactions inserted into the original data set is assumed as $\omega$. $\omega$ relates to a probability of preservation of the privacy in association rule mining, and may be predetermined in an early stage of constitution and stored in the fake transaction inserter 101 as a security parameter. Also, the number of the fake transaction is a variable which has uniform distribution (or other distribution can be used) with an average $\omega$ and a certain range.

The fake transaction inserter 101 selects the number of the fake transaction $\omega i$ (i=1, 2~N) and generates the fake transactions of the number of $\omega i$. The length of the fake transaction is determined as described above. The generated $\omega i$ transactions are inserted between the transactions ti and t(i+1) of the original data set T 110. The fake transaction inserter 101 repeats inserting process described above from i=1 to i=N−1, and stop inserting when i becomes N. By repeating the inserting process, the first virtual data set T' is generated which the fake transaction is inserted into the plurality of the transaction of the original dataset T 110.

In the embodiment of the present invention, the distortion transaction generator 102 generates the second virtual data set acquired by converting at least one of the transactions included in the first virtual data set received from the fake transaction inserter 101 with a predetermined probability. By converting at least one of n=N+(N−1)$\omega$ transactions included in the first virtual data set T'={t'1, t'2, . . . , t'n} with a predetermined probability, it is possible to consolidate the privacy of the transactions of the original data set T 110 in the association rule mining.

In the embodiment of the present invention, the converting of the transaction is replacing a part of bits comprised in the transactions to Boolean complement of the part of the bits. That is, the transactions comprised in the first virtual data set T' expressed to a bit string of any length. The converting means converting 1 to 0 or 0 to 1 of the part of bits of the bit string. The converting also means calculating the transaction of the first virtual data set and a bit string which has a same length with the transaction of the first virtual data set with exclusive OR (XOR, $\oplus$) calculation. In this case, the bit of the transaction which is calculated by XOR with bit of 1 is reversed and the bit of the transaction which is calculated by XOR with bit of 0 is not reversed.

In the embodiment of the present invention, the distortion transaction generator 102 generates bit string ei by selecting 0 or 1 with a predetermined probability, and distorts the transaction t'i comprised in the first virtual data set T' by XOR calculation with bit string ei (Equation 1). In this case, the ri is generated to have a same length with the t'i.

$$t''i = t'i \oplus ei \quad \text{[Equation 1]}$$

In the embodiment of the present invention, the distortion transaction generator 102 selects a probability p (0≤p≤1) and generates the bits based on a density function calculated by Bernoulli function Bernoulli (p). In this case, the generated bit has a value of 1 with a probability of p and 0 with a probability of 1−p. Each bit of the ri is set to be a value of Boolean complement of the generated bit. Therefore, each bit of a distorted transaction, finally calculated through the XOR calculation with ri, will be a value same with the value before the distortion with the probability of p or a reversed value compared with the value before the distortion with the probability of 1−p.

That is, the first virtual data set is generated by generating and inserting the fake transactions into the plurality of transactions comprised in the original data set and the second virtual data set is generated by converting the transactions of the first virtual data set corresponding to the conversion variable with the probability of 1−p. Therefore, the privacy information is protected so an object performing the association rule mining cannot know the privacy information except association rule.

An effect by the apparatus for privacy protection in the association rule mining according to the embodiment of the present invention will be described below.

The privacy protected in a privacy protection type association rule mining can be quantized by a probability of a restoration of the distorted or converted original data by adversary. Therefore, the privacy protection rate in the association rule mining is a value subtracting the probability to configure the transactions of the original data set from the probability of 1.

First, the privacy protection rate in the virtual data set converted by using only the fake transaction inserter 101, that is, the first virtual data set is calculated. In the first virtual data set, since only N transactions among the N+(N−1)$\omega$ transactions is comprised in the original data set T, PrFS, the probability of finding the plurality of transactions comprised in the original data set T among the transactions comprised in the first virtual data set by the adversary may be defined as follows.

$$PrFS = N/(N+(N-1)\omega) \square N/(N+N\omega) = 1/(1+\omega)$$

$$PpFS = 1 - 1/(1+\omega) \quad \text{[Equation 2]}$$

On the contrary, the privacy protection rate in the distortion data set (that is, the virtual data set acquired by converting at least one of N transactions comprised in the original data set with the predetermined probability) converted by only the distortion transaction generator 102 is as follows.

First, the transaction comprised in the original data set is represented by Xi and the transaction of the distortion data set is represented by Yi. And the probability of converting selected by the distortion transaction generator 102 is represented by p. Then, each bit of the transactions is converted to its Boolean complement with a probability of 1−p and preserved its original bit with the probability of p. Therefore, the probability of a restoration from the distorted transactions to the original transactions by the adversary can be calculated as follows.

First, the probability of the restoration of one bit comprised in the transaction is calculated. If the bit value is 1, the probability of reconfiguring the bit exactly can be drawn as follows through a conditional probability.

$$R1 = Pr\{Yi=1|Xi=1\}Pr\{Xi=1|Yi=1\} + Pr\{Yi=0|Xi=1\}Pr\{Xi=1|Yi=0\} \quad \text{[Equation 3]}$$

Meanwhile, the probability to reconfigure the bit which has a value of 0 is calculated as follows.

$$R0 = Pr\{Yi=1|Xi=0\}Pr\{Xi=1|Yi=1\} + Pr\{Yi=0|Xi=0\}Pr\{Xi=0|Yi=0\}$$ [Equation 4]

A probability PrPS to restore the transactions comprised in the original data set will be aR1+(1−a)R0 on the basis of values of R1 and R0. The a is a privacy parameter determined based on a ratio of a probability that the bit of the transaction will be 1 and a probability that the bit will be 0.

As a result, a privacy protection rate PpPS when only the distortion transaction generator 102 is used is 1−(aR1+(1−a)R0).

On the contrary, in the embodiment of the present invention, a privacy protection rate PpHS which two methods for privacy protection described above are used can be calculated based on the calculated probabilities of two methods. First, the probability to reconfigure the transactions of the original data set from the second virtual data set T″ is the same as the multiplication of probabilities to reconfigure the original data set when passing through only one of the fake transaction inserter 101 and the distortion transaction generator 102. That is, PrHS is PrPS/(1+ω) which is PrFS*PrPS. Accordingly, in the embodiment of the present invention, the privacy protection rate PpHS for the transaction comprised in the second virtual data set is defined by 1−PrPS/(1+ω).

As described above, the privacy protection rate when only one of the fake transaction inserter 101 and the distortion transaction generator 102 are used is compared with the privacy protection rate when the apparatus for privacy protection in the association rule mining of the present invention is used as follows.

First, it is effective in the privacy protection rate. The maximum possible value of the privacy, protection rate of the original data set passed through only the distortion transaction generator 102 is 89%.

In the present invention however, because the privacy protection rate increases by the distortion transaction generator 102 again after the privacy protection rate increased proportionally to the number of the fake transactions w inserted by the fake transaction inserter 101, the privacy protection rate will be greater than when only the distortion transaction generator 102 is used.

Comparison with the privacy protection rate of the first virtual data set passing through only the fake transaction inserter 101 is also the same. Because distorting each of the transactions again after using with fake transaction inserter 101 first, the probability that the adversary can restore the original transactions is more decreased, therefore the privacy protection rate of the second virtual data set is greater than that of the first virtual data set.

For example, the original data reconfiguration probability PrHS according to the embodiment of the present invention is PrPS/(1+ω) and PpHS is 1−PrPS/(1+ω). Meanwhile, PrPS or PrFS(1/(1+ω)) is always smaller than 1. Therefore, because the PpHS is 1−PrHs and PrHS defined by a multiplication of the PrPS and PrFS always have smaller value than smaller value between PrPS and PrFS, PpHS always have bigger value than bigger value between PpFS and PpPS.

Further, a memory usage for the privacy protection rate is effective. The privacy protection rate of the first virtual data set passing through only the fake transaction generator 101 increases depending on the number of the fake transactions ω inserted between the plurality of transactions comprised in the original data set. In this case, for more privacy protection rate, ω needs to be bigger, then a size of the first virtual data set is bigger proportionally to ω. For example, ω should be at least 11 so as to set the privacy protection rate to 90%. That is, the 11 times of memory than the original data set is needed to store the virtual data set like above. Therefore, an excessively large amount of memory is used to achieve high privacy protection rate by only the fake transaction inserter 101. Further, since PpFS is defined by 1−(1/(1+ω)), an increase rate of PpFS for the increase of ω gradually decreases, such that the efficient privacy protection in terms of the memory usage is difficult. For example, an increase amount of the privacy protection rate of only the first virtual data set when ω is 20 rather than 10 is just 0.04.

Contrary to this, when the distortion transaction generator 102 is used, the memory is not additionally used. Since the distortion transaction generator 102 just converts the transactions included in the original data set with a predetermined probability, the memory is not additionally consumed. Accordingly, according to the embodiment of the present invention, it is possible to acquire the high privacy protection rate and optimize the quantity of memory additionally required at the same time by using the fake transaction inserter 101 and the distortion transaction generator 102.

For example, according to the embodiment of the present invention, it is assumed that the privacy protection rate PpHS of the second virtual data set is the same as the privacy protection rate PpFS of only the first virtual data set as 0.95. When the averages are calculated according to the definitions of the above-mentioned PpFS and PpHS, the average of a predetermined number of fake transactions inserted into the second virtual data set is 5, while the average of a predetermined number of fake transactions to be inserted in order to acquire the privacy protection rate of only the first virtual data set is 19. Accordingly, it is possible to acquire the same privacy protection rate by only consuming only ¼ more additional memory.

Comparison of the average number of the fake transactions required to generate the first virtual data set passing through only the fake transaction inserter 101, the average number of the fake transactions required to generate the distortion data set passing through only the distortion transaction generator 102, and the average number of the fake transactions at the time of generating the second virtual data set according to the embodiment of the present invention is disclosed in the following table.

TABLE 1

| $P_p$ | FS | PS | HS p = 0.5 | p = 0.7 | p = 0.8 | p = 0.9 | p = 0.95 |
|---|---|---|---|---|---|---|---|
| 0.91 | $\frac{91}{9}$ | 0 | $\frac{2}{9}$ | $\frac{2}{9}$ | $\frac{3}{9}$ | $\frac{8}{9}$ | $\frac{14}{9}$ |
| 0.92 | $\frac{23}{2}$ | 0 | $\frac{3}{8}$ | $\frac{1}{2}$ | $\frac{5}{8}$ | $\frac{9}{8}$ | $\frac{15}{8}$ |
| 0.93 | $\frac{93}{7}$ | 0 | $\frac{4}{7}$ | $\frac{5}{7}$ | $\frac{6}{7}$ | $\frac{10}{7}$ | $\frac{16}{7}$ |
| 0.94 | $\frac{47}{3}$ | 0 | $\frac{5}{6}$ | 1 | $\frac{7}{6}$ | $\frac{11}{6}$ | $\frac{17}{7}$ |
| 0.95 | 19 | 0 | $\frac{6}{5}$ | $\frac{7}{5}$ | $\frac{8}{5}$ | $\frac{12}{5}$ | $\frac{18}{5}$ |
| 0.96 | 24 | 0 | $\frac{7}{4}$ | 2 | $\frac{9}{4}$ | $\frac{13}{4}$ | $\frac{19}{4}$ |
| 0.97 | $\frac{97}{3}$ | 0 | $\frac{8}{3}$ | 3 | $\frac{10}{3}$ | $\frac{14}{3}$ | $\frac{20}{3}$ |

TABLE 1-continued

| | | | | | HS | | |
|---|---|---|---|---|---|---|---|
| $P_p$ | FS | PS | p = 0.5 | p = 0.7 | p = 0.8 | p = 0.9 | p = 0.95 |
| 0.98 | 49 | 0 | $\frac{9}{2}$ | 5 | $\frac{11}{2}$ | $\frac{15}{2}$ | $\frac{21}{2}$ |
| 0.99 | 99 | 0 | 10 | 11 | 12 | 16 | 22 |

In Table 1, the privacy parameter a determining a ratio of a probability that bit(information) of the transaction in the above-mentioned distortion transaction generator 102 will be 1 and a probability that the information in the transaction will be 0 in the above-mentioned distortion transaction generator 102 is 0.9. In addition, Pp is the privacy protection rate of the virtual data set or the distortion data set through each method. FS means a method of using only the fake transaction inserter 101, PS means method of using only the distortion transaction generator 102, and HS means a method of using the fake transaction inserter 101 and the distortion transaction generator 102 according to the embodiment of the present invention. p means a predetermined probability of conversion as described above.

Referring to Table 1, since the fake transaction is not required in the case of PS, the average number of required fake transactions is 0. On the contrary, when FS and HS are compared with each other, a difference in the average numbers of the fake transaction required to achieve the remarkably same privacy protection rate is disclosed.

The result of Table 1 is represented by an actually required memory amount (the unit is megabyte, MB) as shown below. All other conditions are the same as Table 1.

TABLE 2

| | | | | | HS | | |
|---|---|---|---|---|---|---|---|
| Pp | FS | PS | p = 0.5 | p = 0.7 | p = 0.8 | p = 0.9 | p = 0.95 |
| 0.91 | 44.489 | 0 | 0.978 | 1.467 | 1.956 | 3.911 | 2.444 |
| 0.92 | 50.600 | 0 | 1.650 | 2.200 | 2.750 | 4.950 | 8.250 |
| 0.93 | 58.457 | 0 | 2.514 | 3.143 | 3.771 | 6.286 | 10.06 |
| 0.94 | 68.933 | 0 | 3.667 | 4.400 | 5.133 | 8.067 | 12.47 |
| 0.95 | 83.600 | 0 | 5.280 | 6.160 | 7.040 | 10.56 | 15.84 |
| 0.96 | 105.60 | 0 | 7.700 | 8.800 | 9.900 | 14.30 | 20.90 |
| 0.97 | 142.27 | 0 | 11.73 | 13.20 | 14.67 | 20.53 | 29.33 |
| 0.98 | 215.60 | 0 | 19.80 | 22.00 | 24.20 | 33.00 | 46.20 |
| 0.99 | 435.60 | 0 | 44.00 | 48.40 | 52.80 | 70.40 | 96.80 |

In Table 1 and Table 2, and as described above, by the apparatus for privacy protection in the association rule mining according to the embodiment of the present invention, it is possible to acquire a high privacy protection rate by adding a small amount of memory. As a result, it is possible to reduce a risk of a leakage of the privacy information in applying data mining to the personal privacy information.

Hereinafter, a method for privacy protection in association rule mining according to an embodiment of the present invention will be described with reference to FIGS. 2a and 2b. A description of parts duplicated with the description of the apparatus for privacy protection in the association rule mining according to the embodiment of the present invention will be omitted.

Figure 2A:
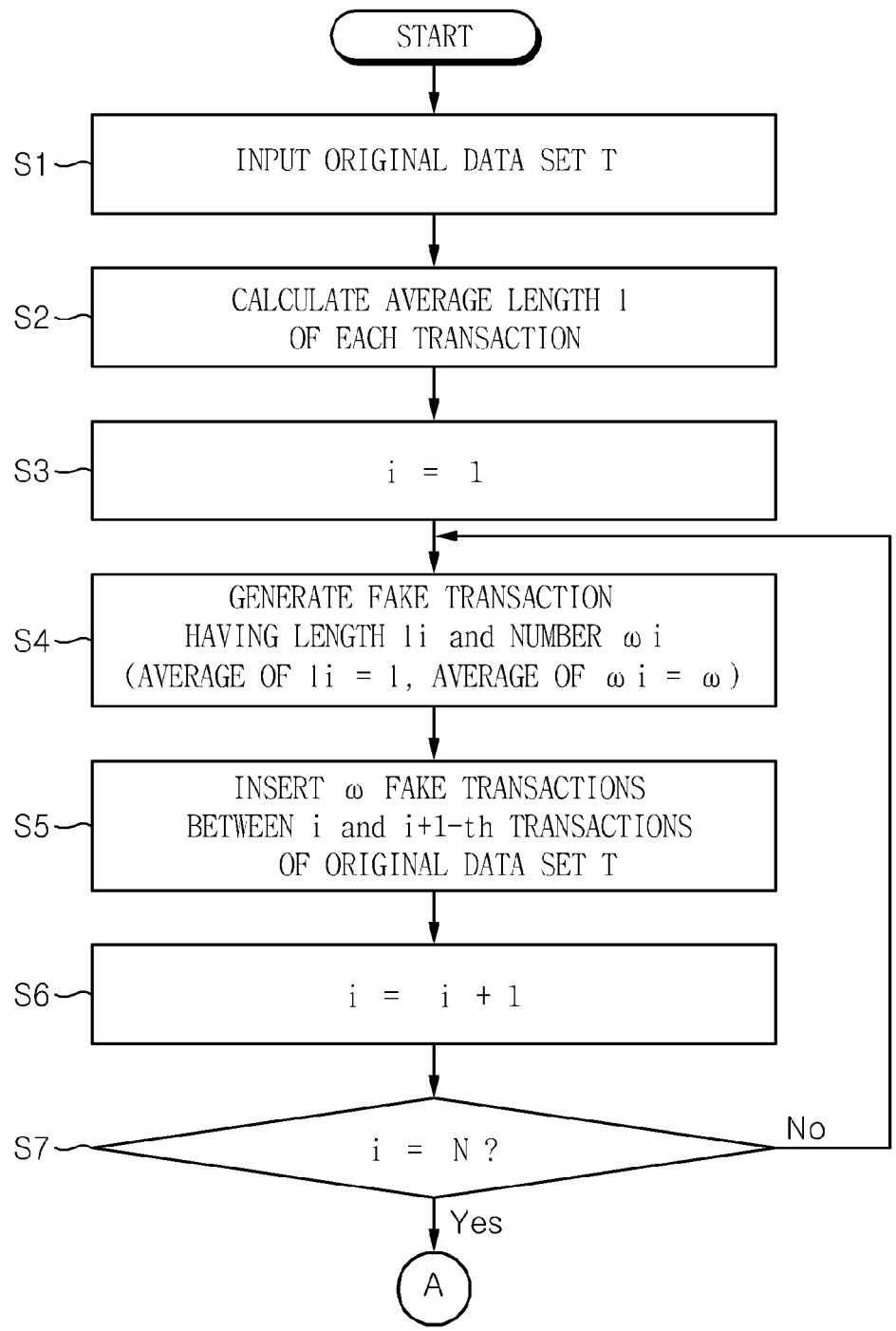
FIGS. 2a and 2b are flowcharts illustrating a method for privacy protection in association rule mining according to an embodiment of the present invention.
Figure 2B:
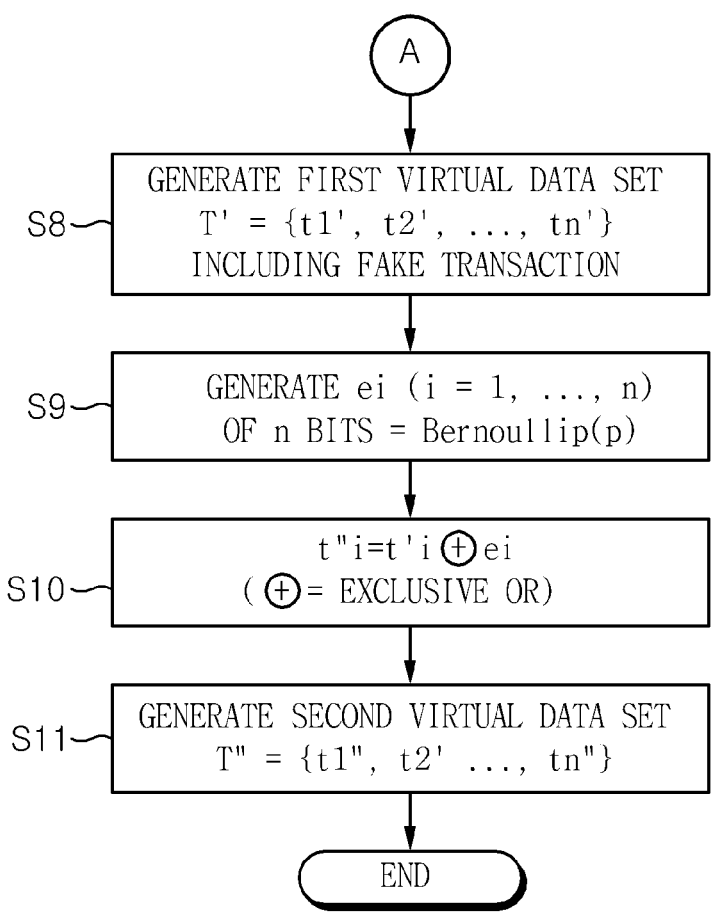

FIGS. 2a and 2b are flowcharts illustrating a method for privacy protection in association rule mining according to an embodiment of the present invention.

Referring to FIGS. 2a and 2b, in the method for privacy protection in the association rule mining according to the embodiment of the present invention, a fake transaction inserter 101 receives an original data set T from the outside (S1) and 1 which the average length of the transactions comprised in the original data set T having received N transactions is calculated (S2). In addition, i is set to 1 (S3) and the fake transaction inserter 101 selects ωi, generates ωi fake transactions (S4), and inserts the generated fake transactions of ωi between ti and t(i+1) which is the transaction comprised in the original data set T(S5). The average length of the generated fake transactions is l. In order to repetitively perform steps S4 and S5, 1 is added to i (S6) and when i is N (S7), all the fake transactions are inserted between the plurality of transactions comprised in the original data set T, generation of the first virtual transaction into which the fake transactions are inserted is completed (S8), and the first virtual data set is transmitted to the distortion transaction generator 102.

A distortion transaction generator 102 generates a second virtual data set by converting transactions comprised in the received first virtual data set. A detailed step of generating the second virtual data set will be described below. First, the bit string ei which has the same length with the transaction t'i which need to be converted (S9) (repetitively generates ei by set i from 1 to the number n=N+(N−1)ω of the first virtual data set). ei is determined by the method described in the embodiment of the present invention.

When ei is generated, the distortion transaction generator 102 sets the result of the exclusive OR of each transaction t'1 of the first virtual data set and the conversion variable ei as each transaction t"i of the second virtual data set to generate n transactions (S10). The distortion transaction generator 102 combines n generated transactions to generate the second virtual data set T" (S11).

Figure 3:
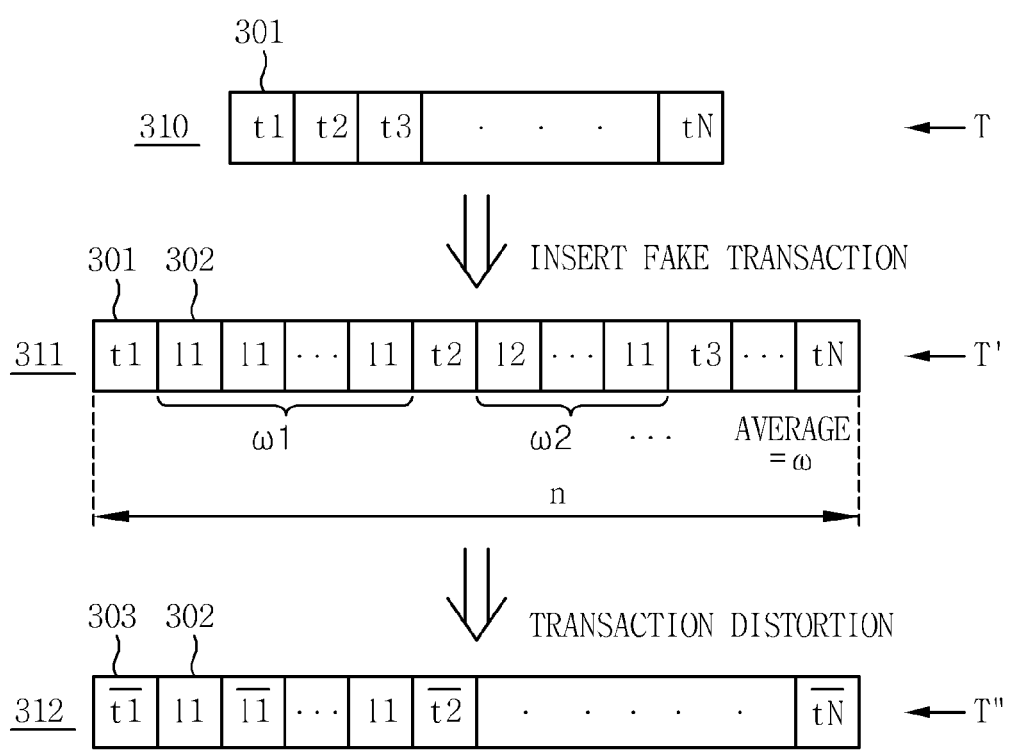
FIG. 3 shows examples of the original data set, the first virtual data set, and the second virtual data set according to the embodiment of the present invention.

FIG. 3 shows examples of the original data set, the first virtual data set, and the second virtual data set according to the embodiment of the present invention.

Referring to FIG. 3, N transactions 301 exist in the original data set T 310. When the fake transaction inserter 101 inserts the fake transactions of ωi having the average length of L, the original data set T 310 is converted into the first virtual data set T' 310 having n (N+(N−1)ω) transactions which the fake transactions are inserted. That is, the first virtual data set T' generated by the fake transaction inserter 101 comprise the transactions included in the original data set and fake transactions 302 generated and inserted by the fake transaction inserter 101.

The first virtual data set T' generated by the fake transaction inserter 101 is converted by the distortion transaction generator 102. That is, a part of the transactions comprised in the first virtual data set T' are converted by the exclusive OR function with the conversion variable ei as described above. The conversion of the transactions means replacing transaction bit information to its Boolean complement.

A description of the apparatus and method for privacy protection in the association rule mining according to the embodiment of the present invention should be used for only a description purpose and does not limit the appended claims of the present invention. Further, except for the embodiment of the present invention, an equivalent invention having the same function as the present invention will also be included in the scope of the present invention.

What is claimed is:

1. An apparatus, comprising:
 a fake transaction inserter that generates fake transactions of a predetermined number each having a predetermined length and inserts the fake transactions between a plurality of transactions comprised in an original data set to generate a first virtual data set; and a distortion transaction generator that protects the privacy of the original data set by generating a second virtual data set by converting data of the transaction of the first virtual data set with a predetermined probability, wherein the distortion transaction generator generates the transaction of the second virtual data set by using a result of an exclusive OR function having the conversion variable and the transaction of the first virtual data set corresponding to the conversion variable as an independent variables.

2. The apparatus of claim 1, wherein the predetermined length is a uniform distribution random variable in which a predetermined number of length variables are distributed within a predetermined range with the same probability.

3. The apparatus of claim 1, wherein an average of the predetermined length is same with an average of a length of the transactions of the original data set.

4. The apparatus of claim 1, wherein the predetermined number is the uniform distribution random variable having an average length and a range determined by using a predetermined security parameter.

5. The apparatus of claim 1, wherein the distortion transaction generator further includes a function to generate conversion variables, having a value of 0 or 1 as the predetermined probability, of the same number as the number of the transactions of the first virtual data set.

6. The apparatus of claim 5, wherein the conversion variable is a Bernoulli function value having the predetermined probability as an independent variable.

7. A method, comprising:

receiving an original data set from a server and calculating an average length of a plurality of transactions comprised in the original data set by a fake transaction inserter;

generating fake transactions of a predetermined number each having a predetermined length and insert the fake transactions between the plurality of transactions to generate a first virtual data set by the fake transaction inserter; and protecting the privacy of the original data set by generating a second virtual data set by converting data of the transaction of the first virtual data set with a predetermined probability by a distortion transaction generator, wherein the generating the second virtual data set generates the transaction of the second virtual data set by using a result of an exclusive OR function having the conversion variable and the transaction of the first virtual data set corresponding to the conversion variable as an independent variables.

8. The method of claim 7, wherein the predetermined length is a uniform distribution random variable in which a predetermined number of length variables are distributed within a predetermined range with the same probability.

9. The method of claim 7, wherein an average of the predetermined length is same with an average of a length of the transactions of the original data set.

10. The method of claim 7, wherein the predetermined number is the uniform distribution random variable having an average length and a range determined by using a predetermined security parameter.

11. The method of claim 7, wherein the generating the second virtual data set further includes generating conversion variables, having a value of 0 or 1 as the predetermined probability, of the same number as the number of the transactions of the first virtual data set.

12. The method of claim 11, wherein the conversion variable is a Bernoulli function value having the predetermined probability as an independent variable.

* * * * *